_United States Patent Office_

2,864,848
Patented Dec. 16, 1958

2,864,848
METHOD OF PRODUCING L-α-GLYCERYL-PHOSPHORYLCHOLINE

Charles Stewart McArthur, Saskatoon, Saskatchewan, Canada, assignor to National Research Council, Ottawa, Ontario, Canada, a body corporate of Canada No Drawing. Application July 19, 1954
Serial No. 444,373

6 Claims. (Cl. 260—461)

This invention relates to an improved method of producing in high yield, from readily available material, L-α-glycerylphosphorylcholine.

The compound itself is known but has been available in only relatively small quantities and at great expense. It is available at about $2800 per gram. Prior methods are both expensive and cumbersome. The compound contains choline, a naturally occurring substance which prevents the development of fatty livers in animals. A cheap source of large amounts of the compound for metabolic and nutritional studies is desired.

Lecithin has the following structure:

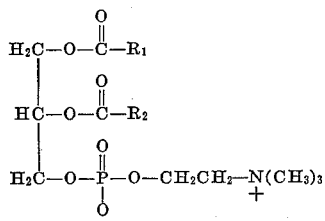

where $R_1$ and $R_2$ are fatty acid radicals.

The object of the present invention is to provide an efficient method of splitting off the fatty acids from lecithin thereby converting it into L-α-glycerylphosphorylcholine and in high yields.

In accordance with the invention the hydrolysis is carried out in water or aqueous alcohol solution in the presence of a soluble mercuric salt which efficiently splits off the fatty acid radicals when the solution is heated at the boiling point of the aqueous solvent. The amount of soluble mercuric salt is not critical. 0.25% is effective. Up to 10% may be used during the reaction period but amounts in excess of 10% tend to destroy a portion of the product produced. When purified lecithin is used the yield of the glycerylphosphorylcholine is 85% of that potentially present in the phospholipid. When crude lecithin is used a yield of 60% has been obtained.

In the following examples the detailed operation of the method of hydrolysis is given.

(1) Egg lecithin (51.9 g.), purified according to the procedure of Hanahan et al. (J. Biol. Chem., 192, 623 (1951) and containing 14.2% combined choline was emulsified with 840 ml. of water, in a Waring blendor. This emulsion mixed with 840 ml. of 2% aqueous mercuric chloride solution was boiled for 12 hours under a reflux condenser. After cooling, the reaction mixture was extracted four times with 600 ml. portions of ethyl ether. The ethereal extracts were discarded and insoluble mercury salts were removed from the aqueous solution by filtration. Mercuric ions were removed by precipitation with hydrogen sulphide in the presence of barium carbonate followed by filtration. In some cases the mercuric sulphide formed colloidal solutions which required the addition of small amounts of charcoal in order to make the filtration effective. On isolation the yield of L-α-glycerylphosphorylcholine was 84.5% of the theoretical yield.

(2) Egg phospholipid (100 g.) containing about 70% lecithin was emulsified with 2000 ml. of water. 2000 ml. of absolute alcohol containing 20° g. of mercuric chloride was added and the mass was refluxed for 26 hours to split off the fatty acid radicals. The fatty acids and mercuric ions were removed as described in previous example.

The clear aqueous alcoholic solution was passed through a mixture of "Amberlites IR–45" (2 volumes) and I. R. C. 50 (1 volume), which removes both cations and anions such as barium ions, choline, glycerophosphoric acid, glycerylphosphorylethanolamine and chloride ions. The clear colourless effluent was taken to dryness under reduced pressure at a bath temperature of 45°. The syrupy residue was dissolved in 1000 ml. of 99% ethanol and a saturated solution of cadmium chloride in 95% ethanol was added dropwise with stirring until precipitation of the cadmium chloride complex was complete. After cooling in the refrigerator the precipitate was filtered with suction, washed with a small volume of cold 99% ethanol and finally with ethyl ether. The complex was air dried and analyzed for labile ester-bound choline. The yields of glycerylphosphorylcholine on an over-all basis were about 60%.

The L-α-glycerylphosphorylcholine may be recovered from its cadmium chloride complexes by allowing aqueous solutions of the complexes to pass through a mixed column of "Amberlites IR–45" (2 volumes) and I. R. C. 50 (1 volume). The effluent from the column when taken to dryness yields L-α-glycerylphosphorylcholine in the form of a very viscous liquid or glass that slowly becomes crystallized.

Hydrolysis of the phospholipid in the aqueous alcohol causes the lecithin to remain in true solution and it therefore is not occluded in large masses of solid lipid which form when the reaction is carried out in water.

It has been found that when the hydrolysis of lecithin is carried out under the conditions described above neither migration of the phosphorylcholine moiety nor racemization occurs.

What I claim is:

1. In the production of L-α-glycerylphosphorylcholine in high yield, the method which comprises intimately mixing lecithin in one of a group of solvents consisting of water and aqueous alcohol, adding thereto a soluble mercuric salt, heating the mixture at the boiling point of the solvent and continuing the heating until the fatty acids are liberated.

2. The method defined in claim 1 wherein purified lecithin is used and water is the solvent.

3. The method defined in claim 2 wherein crude lecithin is used and aqueous alcohol is the solvent.

4. In the production of L-α-glycerylphosphorylcholine in high yield, the method which comprises intimately mixing lecithin in one of a group of solvents consisting of water and aqueous alcohol, adding thereto 0.25 to 10% of mercuric chloride, heating the mixture at the boiling point of the solvent and continuing the heating until the fatty acids are liberated.

5. In the production of L-α-glycerylphosphorylcholine in high yield, the method which comprises emulsifying lecithin in one of a group of solvents consisting of water and aqueous alcohol, mixing with the emulsion a soluble mercuric salt to split off the fatty acid radicals, heating the mixture under reflux conditions until the fatty acid radicals are split off and removing insoluble mercury salts from the aqueous solution.

6. In the production of L-α-glycerylphosphorylcholine in high yield, the method which comprises emulsifying lecithin in aqueous alcohol, mixing with the emulsion aqueous mercuric chloride, heating the mixture under reflux conditions until the fatty acid radicals are split off and the lecithin is hydrolyzed and removing insoluble mercury salts from the solution.

References Cited in the file of this patent
UNITED STATES PATENTS 1,012,923    Schoeller _____ Dec. 26, 1911

OTHER REFERENCES

Organic Chemistry, Karrer, Elsevier Publ. Co., Inc., New York, N. Y., 1950, pp. 218 and 219.

The Phosphatides, Witcoff, Reinhold Publishing Co., New York, N. Y., 1951, pp. 15 and 59.